(12) United States Patent
Peterson et al.

(10) Patent No.: US 6,186,635 B1
(45) Date of Patent: Feb. 13, 2001

(54) LUMINESCENT SAFETY DEVICES

(76) Inventors: Gary Peterson, 1130 6th Ave., Longmont, CO (US) 80501; Pratap Y. Korgaokar, 412 Evergreen Dr., Waterville, ME (US) 04901

(*) Notice: Under 35 U.S.C. 154(b), the term of this patent shall be extended for 0 days.

(21) Appl. No.: 09/304,646

(22) Filed: May 4, 1999

(51) Int. Cl.[7] ........................................... F21V 9/16
(52) U.S. Cl. .................. 362/84; 362/473; 250/461.1; 252/301.36
(58) Field of Search ............................. 362/84, 473, 276, 362/802; 250/462.1, 463.1, 466.1, 461.1; 252/301.36

(56) References Cited

U.S. PATENT DOCUMENTS

| | | |
|---|---|---|
| 5,330,195 | 7/1994 | Gulick . |
| 5,374,377 * | 12/1994 | Nguyen et al. ................ 252/301.36 |
| 5,567,040 | 10/1996 | Tabanera . |
| 5,580,154 | 12/1996 | Coulter et al. . |
| 5,649,755 | 7/1997 | Rapisarda . |
| 6,016,101 * | 1/2000 | Brown ............................ 362/473 X |
| 6,059,377 * | 5/2000 | Wu ................................. 362/473 X |

* cited by examiner

Primary Examiner—Stephen Husar
(74) Attorney, Agent, or Firm—Joseph H. McGlynn

(57) ABSTRACT

A device for increasing the visibility of bicyclists and others "at risk" at night and during other low visibility conditions, and the chemical method of producing the same, wherein the device is a luminescent, planar portion of material manufactured using a mixture of PVC, phosphorescent, brightener, and fluorescent color that results in bonding of the phosphorescent and fluorescent ingredients. The luminescent portion provides continuous, visible light emission in the dark and at other times of low visibility, given intermittent exposure to an external light source. A fastener for attaching the luminescent material to the spokes of a bicycle wheel is also provided. An anchor pin projecting through the luminescent portion has a slotted end for receiving the spoke of a bicycle wheel. A lock washer fits over the tapered end of the anchor pin and retains the spoke between the closed end of the slot and a flange. A companion light source that produces invisible, intermittent light (BLB) is also provided for.

5 Claims, 2 Drawing Sheets

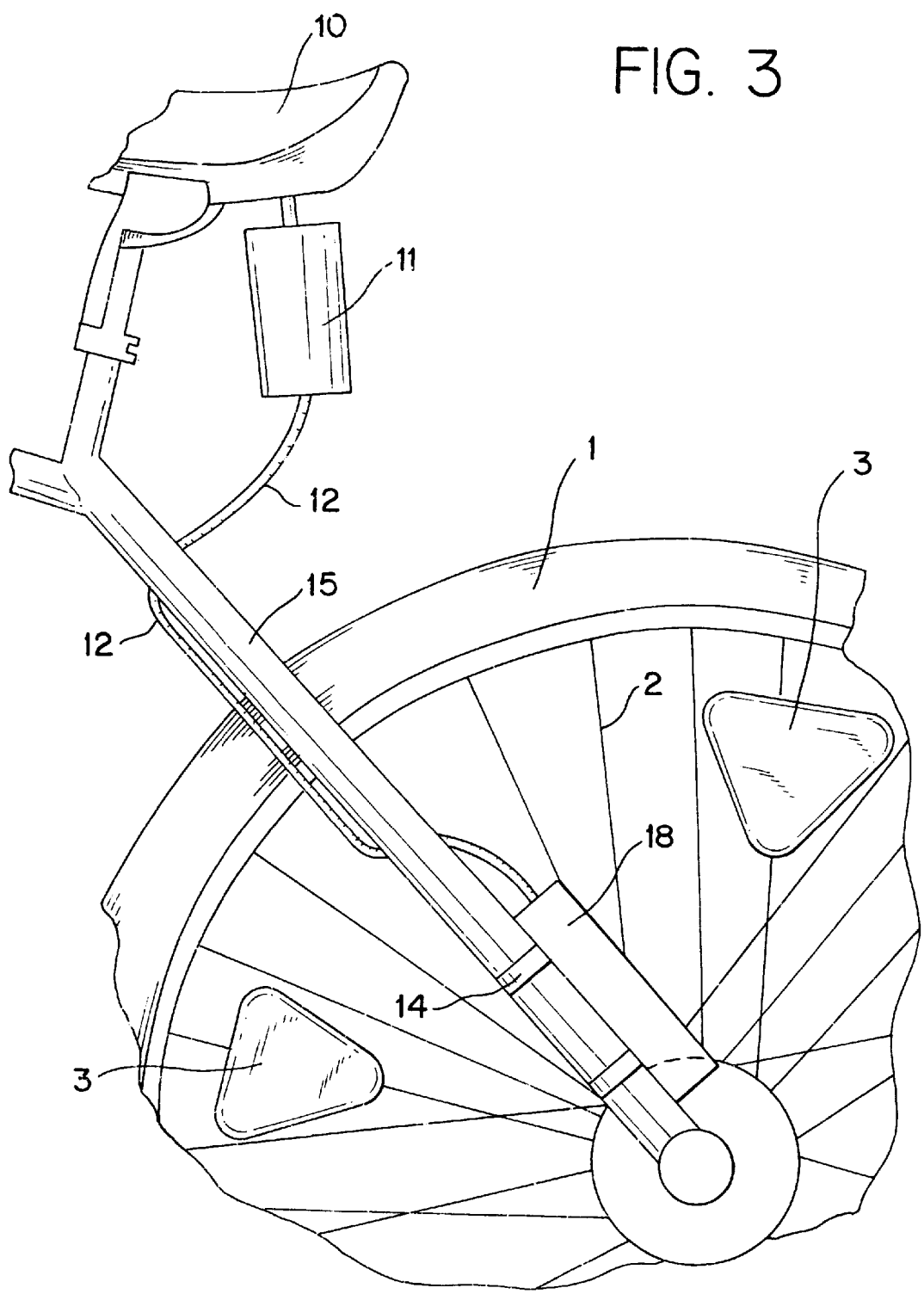

LUMINESCENT SAFETY DEVICES

BACKGROUND OF THE INVENTION

The present invention relates generally to light-emitting sports and safety equipment, and in particular to a luminescent safety device for attachment to the wheel of a bicycle, and the method of manufacturing the same.

DESCRIPTION OF THE PRIOR ART

Reducing or eliminating the high number of accidents and deaths caused by the lack of adequate illumination at night or during other times of low visibility, needs to be resolved through applied technological development. Low visibility safety issues apply to "at risk" situations that include fire and police patrol officers, highway workers, search and rescue teams. and bicycle/pedestrians. Bicycling is an increasingly popular recreational activity, one that people of all walks of life enjoy. However, bicycling is also potentially dangerous especially at night, when the bicyclist is less visible to automobile drivers and pedestrians. To address this problem, bicyclists typically equip themselves or their vehicle with visible lighting (light bulbs) or reflective devices. However, these methods rely, on direct illumination of the objects by, continuous visible light. They are also directional and can not be seen from behind or perpendicular to the light source, and therefore, provide a less than adequate measure of safety.

A number of devices rely solely on an external light source for illumination of equipment and their environment with visible lighting. Light bulbs illuminate a specific area. Again, this method relies on direct illumination.

A number of safety devices which emit light in the absence of an external light source are known. Some of these devices are electrically powered. For example, U.S. Pat. No. 5,649,755 describes a battery-powered, light-transmitting adornment for apparel.

Similarly, U.S. Pat. No. 5,580,154 discloses a child's glove apparatus including a light circuit system integrally packaged within the glove member.

U.S. Pat. No. 5,567,040 discloses a jacket and bag assembly having a battery, an electroluminescent film strip, and an inverter.

These and similar electrically powered devices are undesirable as safety equipment, however, since they require periodic replacement of batteries, and are relatively expensive. Also, they do not provide illumination in excess of 1000 ft, and in a direction exceeding 180 degrees from the light source.

Luminescent sports equipment is also known. For example, U.S. Pat. No. 5,330,195 describes a glow-in-the-dark golf ball, having a surface coated with luminescent paint sold under the trade name MOONGLOW.

However, the prior art luminescent sports equipment does not provide illumination of sufficient brightness, color, or clarity to afford an appropriate measure of visibility and safety. In addition, the prior art has yet failed to provide a luminescent device that can be seen and at any angle over a 360 degree arc and over 1000 ft. from the source during low visibility (rain. sleet, snow, fog, dusk, dawn, and at night), in different colors more readily visible to the night eye (blue, red, yellow, etc.), and that may be installed easily, and inexpensively on virtually all commercially available bicycles. Therefore, there remains a need for a method of manufacturing luminescent sports safety equipment that provides a glow-in-the-dark material of improved brightness, color, and visibility. In addition, the prior art has yet failed to provide a luminescent device that may be installed easily and inexpensively on the wheels of virtually all commercially available bicycles.

SUMMARY OF THE INVENTION

The present invention overcomes the drawbacks of the prior art by providing a light-emitting device (LED) that may be installed readily on virtually any bicycle,or used in any low light "at risk" situation, and a method of manufacturing the same which provides improved illumination and visibility in the absence of an external light source. This invention includes a light-emitting device that may be attached easily to the spokes of a bicycle wheel. In addition, the invention comprises a method of manufacturing a luminescent safety device for bicyclists that provides improved light-emitting capability.

This invention includes a companion light source that produces invisible intermittent light (BLB), used to enhance the output of the LED which is easily attached to the bicycle.

The invention includes a flexible, generally planar portion which produces a continuous, visible emission in any one of a variety of vibrant colors after intermittent exposure to sunlight or invisible intermittent lighting sources, i.e., BLB (Black Light Blue). This portion of the invention is constructed from aproprietary chemical coating process comprised of a mixture of flexible polyvinylchloride (PVC), phosphorescent, mineral oil, brightener, and fluorescent pigment, combined in a manufacturing process that allows the phosphorescent to bond with the fluorescent pigment. The manufacturing process produces a luminescent glow that is brighter, more colorful, and more visible than any known phosphorescent devices.

Further provided is an improved means of attaching the luminescent portion to a bicycle. This aspect of the invention comprises an anchor with a slotted pin projected through the center of the luminescent portion. A button on one end of the anchor secures it to the LED portion. The slotted pin has a tapered, flanged portion on its distal end for the purpose of receiving and retaining a lock washer. The LED portion thus may be easily secured to the spoke of a bicycle wheel by fitting the slotted pin over the spoke and pushing the lock washer onto the pin.

Accordingly, it is an object of this invention to provide an improved safety device for bicyclists.

It is a further object of this invention to provide a chemical method of manufacturing LED's for night and other low visibility "at risk" applications.

It is a further object of this invention to provide a bicycle safety device that affords improved illumination, color, and visibility for bicyclists in the absence of an external light source.

It is a further object of this invention to provide a method of manufacturing luminescent safety equipment that affords greater illumination, color, and visibility of the equipment without reliance on direct illumination by a continuous visible light source.

It is a further object of this invention to provide a bicycle safety device that may be installed easily on the wheel of virtually any commercially available bicycle.

These and other objects and advantages of the present invention will become apparent from the detailed description below, when taken in conjunction with the annexed drawings.

BRIEF DESCRIPTION OF THE DRAWINGS

FIG. 3 shows a side view of the LED and external light source attached to a bicycle wheel.

DESCRIPTION OF THE PREFERRED EMBODIMENT

Figure 1:
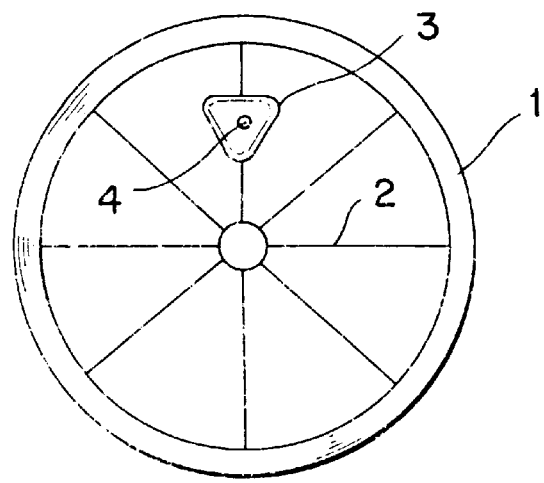
FIG. 1 shows a view of the bicycle illumination device installed on the wheel of a bicycle in accordance with the present invention.

Referring now to the drawings in greater detail, there is shown in FIG. 1 a conventional bicycle wheel, comprising an outer rim 1 connected to a central axle by means of a plurality of radially extending spokes 2. As shown in FIG. 1, the illumination device 3 of the present invention may be attached to the spoke 2 to provide a light source that increases the visibility of the bicycle in the dark, in a manner described in more detail below.

Figure 2:
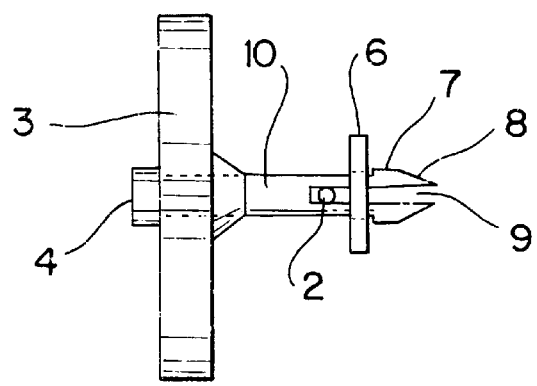
FIG. 2 shows a side view of the bicycle illumination device according to the present invention.

As may be appreciated from FIGS. 1 and 2 taken together, the light emitting device (LED) of the present invention comprises generally a planar, flexible portion 3 and an anchor pin 10. Though the planar portion 3 is shown in FIG. 1 as a generally triangular shape, it should be understood that this portion may be constructed in a variety of shapes and sizes without departing from the scope of the invention.

The flexible, planar portion 3 is constructed from a mixture of polyvinylchloride (PVC) (water clear, shore A durameter),, brightener (manufactured by Bayer), and fluorescent color (manufactured by Day Glow of Cleveland, Ohio). The phosphorescent, brightener is mixed in a ratio of 6 pounds to 100 pounds of PVC, and fluorescent coloring is mixed in a ratio of 4 pounds per 100 pounds of PVC, respectively. Four drops of mineral oil are used per 100 pounds of PVC. The manufacturing process uses a 1½ inch to 2½ extruder with a 24 to 1 length to diameter ratio, having a barrier screw type with a Maddoc mixing section of 2.5 to 1 compression ratio and a breaker plate with 3/16 inch holes. The extruder has five individual heating zones, four barrel heating, and three die heating. Extruder barrels 4, 3, 2, and 1 are run at temperatures of 330, 330, 335, and 320 degrees Fahrenheit, respectively. Dies 3, 2, and 1 are run at temperatures of 335, 335, and 330 degrees Fahrenheit, respectively. The above described manufacturing process results in a bonding of the phosphorescent and fluorescent material to allow the material to glow in a variety of fluorescent colors, including but not limited to green, yellow, red, blue, pink, and orange. The result is a luminescent material that is brighter and more visible in the dark than known luminescent materials. The material used to construct the flexible, planar portion 3 of the illumination device of the present invention is capable of providing visible, continuous light following intermittent exposure to an external light source.

Referring now particularly to FIG. 2, showing a side view of the illumination device, an anchor pin 10 is projected through a hole in middle of the planar portion 3 and secured on either side thereof by a button or pin head 4 and a flange 5. The pin head 4 could be unitary with the pin 10 or it could be merely integral therewith. The flange 5 could be a separate piece which is secured to the pin in any conventional manner.

The anchor pin 10 is preferably constructed from a continuous piece of semi-rigid plastic or similar material. As further shown in FIG. 2, a diametric slot 9 is formed into the distal end of the anchor pin 10, extending approximately halfway into the length of the anchor pin 10, thereby forming two legs on the end of the pin 10. The slot 9 is of sufficient width to receive the spoke 2 of a bicycle wheel. A lock washer 6 is fitted onto the shaft of the anchor pin 10, providing means to securely hold the illumination device to the spoke 2 in the manner described below. A raised, circumferential flange 7 is also formed near the distal end of the anchor pin 10, spanning slightly less than half the length of the pin 10. The circumference of the distal flange 7 is slightly greater than the interior circumference of the lock washer 6, while the distal end of the pin 10 is tapered at 8 to a diameter slightly less than that of the lock washer 6. Thus, it may be appreciated that the lock washer 6 may be slid onto the tapered end of the anchor 10, momentarily compressing the slotted portion 9, and is retained on the shaft of the anchor pin 10 by the distal flange 7.

The illumination device (LED) of the present invention may be securely attached to the spoke 2 of a bicycle wheel in the manner described below. The lock washer 6 is first removed from the anchor pin 10 by compressing the slot 9 with fingers and pulling the washer 6 from the shaft. The slot 9 of the anchor pin 10 is then fitted over the spoke 2 of the bicycle wheel, such that the face of the flexible, planar portion 3 with the head 4 faces outward, as shown in FIG. 1. The lock washer 6 is then pushed onto the tapered end 8 of the anchor pin 10, which compresses slightly at the slot 9, allowing the washer 6 to slide onto the shaft of the anchor pin 10. When the lock washer 6 is slid past the tapered portion 8 and the shoulder on the distal flange 7, the compression on the slot 9 is released, and the lock washer 6 is retained on the anchor pin 10 by the shoulder on the flange 7. Thus, the lock washer 6 holds the spoke 2 securely between the closed end of the slot 9 and the shoulder on the distal flange 7. The illumination device may be removed from the spoke 2 by compressing the slot 9 with the fingers to remove the lock washer 6.

Figure 4:
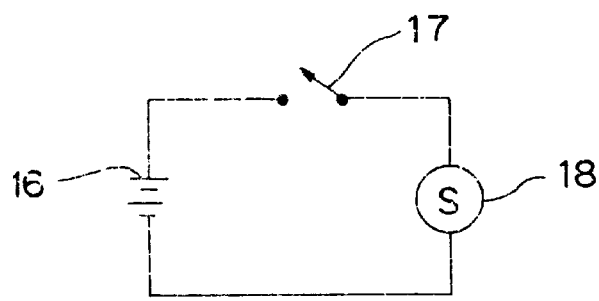
FIG. 4 shows a schematic diagram of the electrical system which powers the external light source.

FIG. 3 shows the present invention mounted on the rear wheel of a bicycle. The power source 11 can be attached behind the seat 10 by any conventional attachment means. The power source will contain a conventional battery 16 (see FIG. 4) and a switch 17 which will intermittently connect the battery 16 with the light 18. This type of intermittent switch is conventional and is similar to the type of switch used with strobe lights, for example. Therefore, no further description of the switch is necessary.

By providing an intermittent power source, the battery used with the present invention will last longer before it must be replaced. Also, the light 18 used with the present invention is the type referred to as "black light" because it emits an invisible light, i.e. a light not discernible by the human eye. This type of light will not cause a person observing it any discomfort the way a normal strobe light does, and it will not provide any distraction to an observer. However, the light emitted by the light 18 will cause light to be stored in the coating on the LED3 over a period of time, and then re-emitted by the LED to provide an illumination that can be seen by the human eye.

As can be seen in FIG. 3, the power source 11 is connected to the light 18 by electrical wires 12, which can be connected to the fork 15 of the bicycle in any conventional manner. The light 18 is also connect to the fork 15 by any conventional fastener. The light 18 will be fastened so that its invisible light will be directed onto the LED's 3 which will absorb this light in their coatings and re-emmit it in conditions of low visibility as visible light.

Also, it should be noted that only one light 18 and two LED's 3 are shown in FIG. 3, however, this is merely for illustrational purposes. In actual use, two lights 18 will be mounted on each of the bicycle forks 15 on opposite sides of the tire 1, and at least four LED's (two for each side of the tire) will be used. The wires which lead from the power source 11 to the lights 18 can be connected to the power source 11 by a conventional Y-connector (not shown).

The advantages of the bicycle illumination device and the method of manufacturing the same according to the present invention may now be appreciated. The invention provides a safety device that affords improved visibility for bicyclists in the absence of an external light source. The unique manufacturing process produces an illumination device that provides brighter, more visible, and more colorful light than the prior art luminescent devices. The device is inexpensive, durable, and reliable, and may be attached and removed easily to and from the wheel of almost any commercially available bicycle.

The light-emitting device (LED) is also used in conjunction with an invisible, intermittent lighting source i.e.. BLB (Black Light Blue) to further activate the light emitting properties. The invisible intermittent lighting source is inexpensive, durable, and reliable, and may be attached and removed easily from the fork stay of almost any commercially available bicycle.

Although the bicycle illumination device and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What we claim as my invention is:

1. A safety device comprising:

a planar body portion having a pin attached thereto, said pin having a headed portion on one end and a projecting shaft on another end, said projecting shaft having an enlarged head on one end, and said projecting shaft having a slot means for receiving a bicycle spoke, said slot means being open adjacent said enlarged head on said projecting shaft, and said slot means being closed adjacent said planar body portion, and washer means for compressing said slot means after a bicycle spoke has been inserted into said slot means, and at least said planar body portion being made from a compound comprising a ratio of six parts of phosphorescent brightener, and four parts of fluorescent coloring, and four drops of mineral oil to 100 parts of polyvinylchloride.

2. A luminescent coating for safety devices which produces a continuous, visible emission in any one of a variety of vibrant colors after intermittent exposure to sunlight or invisible intermittent lighting sources, said compound comprising:

a compound comprising a ratio of six parts of phosphorescent brightener, and four parts of fluorescent coloring, and four drops of mineral oil to 100 parts of polyvinylchloride.

3. A safety device comprising:

means for absorbing light from an external light source, an external light source, said external light source being mounted on a support for directing light onto said means for absorbing light, said external light source emitting an invisible light, and said means for absorbing light having a coating means for absorbing and storing said invisible light and for re-emmiting visible light.

4. The safety device as claimed in claim 3, wherein said coating means comprises a compound comprising a ratio of six parts of phosphorescent brightener, and four parts of fluorescent coloring, and four drops of mineral oil to 100 parts of polyvinylchloride.

5. The safety device as claimed in claim 3, wherein said external light source is powered by a battery, and an intermittent switch is interposed between said light source and said battery.

\* \* \* \* \*